United States Patent
Kanno

(10) Patent No.: US 9,349,530 B2
(45) Date of Patent: May 24, 2016

(54) WIRELESS POWER TRANSMISSION SYSTEM, POWER TRANSMITTING DEVICE, AND POWER RECEIVING DEVICE

(71) Applicant: Panasonic Corporation, Osaka (JP)

(72) Inventor: Hiroshi Kanno, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 545 days.

(21) Appl. No.: 13/794,944

(22) Filed: Mar. 12, 2013

(65) Prior Publication Data

US 2013/0264864 A1 Oct. 10, 2013

Related U.S. Application Data

(60) Provisional application No. 61/622,041, filed on Apr. 10, 2012.

(51) Int. Cl.
*H01F 38/14* (2006.01)

(52) U.S. Cl.
CPC ........................... *H01F 38/14* (2013.01)

(58) Field of Classification Search
CPC ........... H01F 38/14; H02J 17/00; H04B 10/00
See application file for complete search history.

(56) References Cited

U.S. PATENT DOCUMENTS

| | | | |
|---|---|---|---|
| 2008/0266748 A1* | 10/2008 | Lee | H02J 5/005 361/270 |
| 2008/0278264 A1 | 11/2008 | Karalis et al. | |
| 2011/0037322 A1 | 2/2011 | Kanno | |
| 2011/0176251 A1 | 7/2011 | Lee | |
| 2012/0007435 A1* | 1/2012 | Sada | H02J 17/00 307/84 |
| 2012/0212074 A1 | 8/2012 | Uchida | |
| 2013/0009462 A1 | 1/2013 | Amano et al. | |

FOREIGN PATENT DOCUMENTS

| | | |
|---|---|---|
| JP | 08-148360 A | 6/1996 |
| JP | 09-330837 A | 12/1997 |
| JP | 2002-353050 A | 12/2002 |
| JP | 2004-241410 A | 8/2004 |

(Continued)

OTHER PUBLICATIONS

International Preliminary Report on Patentability for corresponding International Application No. PCT/JP2013/001396 dated Nov. 12, 2013.

(Continued)

*Primary Examiner* — Thienvu Tran
*Assistant Examiner* — Pinping Sun
(74) *Attorney, Agent, or Firm* — Renner, Otto, Boisselle & Sklar, LLP

(57) ABSTRACT

A wireless power transmission system as an embodiment of the present disclosure transmits electric power by a non-contact method from a first inductor to a second inductor, or vice versa, via resonant magnetic coupling. The wireless power transmission system includes: the first inductor that has a center hole; the second inductor that is spaced apart from the first inductor and that is smaller in size than the hole of the first inductor; and a magnetic body member that is arranged on one side of the first inductor so as to face the second inductor and that covers at least a part of the first inductor. That at least a part of the first inductor reaches an outer edge of the first inductor from an inner edge thereof.

9 Claims, 10 Drawing Sheets

(56) References Cited

FOREIGN PATENT DOCUMENTS

| | | | | |
|---|---|---|---|---|
| JP | 2004241410 A | * | 8/2004 | ............ H02J 17/00 |
| JP | 2009-188131 A | | 8/2009 | |
| JP | 2009188131 A | * | 8/2009 | ............ H01F 38/14 |
| JP | 2009-252970 A | | 10/2009 | |
| JP | 2011-072188 A | | 2/2011 | |
| JP | 2011-041464 A | | 4/2011 | |
| JP | 2011072188 A | * | 4/2011 | ............ H02J 17/00 |
| JP | 2011-120470 A | | 6/2011 | |
| JP | 2011-200052 A | | 10/2011 | |
| JP | 2011200052 A | * | 10/2011 | ............ H02J 17/00 |
| JP | 2012-070557 A | | 4/2012 | |
| JP | 2012-070566 A | | 4/2012 | |
| WO | WO 2011/001812 A1 | | 1/2011 | |
| WO | WO 2011001812 A1 | * | 1/2011 | ......... H01F 27/2823 |
| WO | WO 2011/074082 A1 | | 6/2011 | |
| WO | WO 2011074082 A1 | * | 6/2011 | ............ H02J 17/00 |

OTHER PUBLICATIONS

Form PCT/ISA/237 for corresponding International Application No. PCT/JP2013/001396 dated Apr. 2, 2013 and Partial English translation.

* cited by examiner

WIRELESS POWER TRANSMISSION SYSTEM, POWER TRANSMITTING DEVICE, AND POWER RECEIVING DEVICE

This application claims priority under 35 USC §119(e) to U.S. Provisional Application No. 61/622,041 filed on Apr. 10, 2012, the entire contents of which are incorporated herein by reference.

BACKGROUND

1. Technical Field

The present disclosure relates to a resonant magnetic coupling type non-contact power transmission technology for transmitting electric power wirelessly using resonant magnetic coupling.

2. Description of the Related Art

United States Patent Application Publication No. 2008/0278264 (FIGS. 12 and 14) discloses a new type of wireless power transmission system for transmitting electric power wirelessly (through a space) from one of two resonators to the other, and vice versa. That wireless power transmission system couples those two resonators with each other via the evanescent tail of the oscillation electric power of the resonant frequency that is produced in the space surrounding those two resonators, thereby transmitting the oscillation electric power wirelessly (i.e., by a non-contact method).

Japanese Laid-Open Patent Publication No. 2011-41464 discloses another resonant magnetic coupling type wireless power transmission system. Such a wireless power transmission system can raise the voltage effectively in transmitting electric power with relatively low coupling efficiency.

SUMMARY

When electric power is transmitted via resonant magnetic coupling, the resonant magnetic field might leak out of the system and could do harm on surrounding persons.

One non-limiting, and exemplary embodiment provides a wireless power transmission system and power transmitting device that can suppress such a leaking magnetic field.

In one general aspect, a wireless power transmission system disclosed herein is configured to transmit electric power by a non-contact method from a first inductor to a second inductor, or vice versa, via resonant magnetic coupling. The system includes: the first inductor that has a center hole; the second inductor that is spaced apart from the first inductor and that is smaller in size than the hole of the first inductor; and a magnetic body member that is arranged on one side of the first inductor so as to face the second inductor and that covers at least a part of the first inductor. That at least a part of the first inductor reaches an outer edge of the first inductor from an inner edge thereof.

In another general aspect, a power transmitting device disclosed herein is used in a wireless power transmission system that is configured to transmit electric power by a non-contact method from a first inductor to a second inductor, or vice versa, via resonant magnetic coupling. The device includes: the first inductor that is spaced apart from the second inductor and that has a center hole that is larger in size than the second inductor; and a magnetic body member that is arranged on one side of the first inductor so as to face the second inductor and that covers at least a part of the first inductor. That at least a part of the first inductor reaches an outer edge of the first inductor from an inner edge thereof.

According to the above aspect, it is possible to suppress the leaking magnetic field using a magnetic body member.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1:
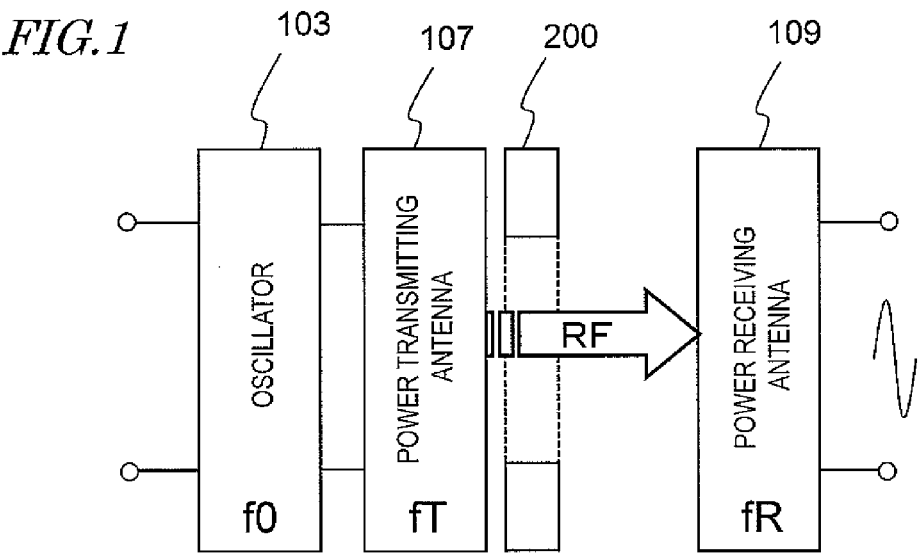
FIG. 1 illustrates an exemplary basic configuration for a wireless power transmission system according to the present disclosure.

In one general aspect, a wireless power transmission system disclosed herein is configured to transmit electric power by a non-contact method from a first inductor to a second inductor, or vice versa, via resonant magnetic coupling. The system includes: the first inductor that has a center hole; the second inductor that is spaced apart from the first inductor and that is smaller in size than the hole of the first inductor; and a magnetic body member that is arranged on one side of the first inductor so as to face the second inductor and that covers at least a part of the first inductor, that at least a part of the first inductor reaching an outer edge of the first inductor from an inner edge thereof.

In one embodiment, the magnetic body member covers the first inductor entirely.

In another embodiment, the magnetic body member covers the first inductor only partially.

In another embodiment, the magnetic body member includes a plurality of parts, each of which covers the first inductor from its inner edge through its outer edge.

In another embodiment, the magnetic body member includes a portion that extends from the inner edge of the first inductor toward the center of the hole and a portion that extends outside of the first inductor from the outer edge of the second inductor.

In another embodiment, the magnetic body member has a center hole that is larger in size than the second inductor.

In another embodiment, the magnetic body member has a portion that faces at least one of the inner and outer edge side surfaces of the first inductor.

In another embodiment, the magnetic body member encloses the first inductor.

In another embodiment, the second inductor is built in an electric vehicle.

In another embodiment, the first inductor is embedded in a road.

In another embodiment, the size of the first inductor is larger when measured in a first direction than when measured perpendicularly to the first direction.

In another general aspect, a power transmitting device disclosed herein is for use in a wireless power transmission system that is configured to transmit electric power by a non-contact method from a first inductor to a second inductor, or vice versa, via resonant magnetic coupling. The device includes: the first inductor that is spaced apart from the second inductor and that has a center hole that is larger in size than the second inductor; and a magnetic body member that is arranged on one side of the first inductor so as to face the second inductor and that covers at least a part of the first inductor, that at least a part of the first inductor reaching an outer edge of the first inductor from an inner edge thereof.

In another embodiment, the magnetic body member covers the first inductor entirely.

In another embodiment, the magnetic body member covers the first inductor only partially.

In another embodiment, the magnetic body member includes a plurality of parts, each of which covers the first inductor from its inner edge through its outer edge.

In another embodiment, the magnetic body member includes a portion that extends from the inner edge of the first inductor toward the center of the hole and a portion that extends outside of the first inductor from the outer edge of the first inductor.

In another embodiment, the magnetic body member includes an additional portion that faces at least one of the inner and outer edge side surfaces of the first inductor.

In another embodiment, the magnetic body member encloses the first inductor.

In another embodiment, the first inductor is embedded in a road.

In another embodiment, the size of the first inductor is larger when measured in a first direction than when measured perpendicularly to the first direction.

In another aspect, a power receiving device disclosed herein is for use in a wireless power transmission system described above. The power receiving device includes one of the first and second inductors that receives power.

Before specific embodiments of a wireless power transmission system, a power transmitting device, and a power receiving device according to the present disclosure are described, the basic configuration of the present disclosure will be described briefly.

According to one aspect of the present disclosure, a wireless power transmission system includes a first inductor and a second inductor and transmits electric power by a non-contact method from the first inductor to the second inductor, or vice versa, via resonant magnetic coupling. The first inductor has a center hole. The second inductor is spaced apart from the first inductor and is smaller in size than the hole of the first inductor. One of the first and second inductors functions as a power transmitting antenna's inductor, while the other functions as a power receiving antenna's inductor.

Now take a look at FIG. 1, which illustrates an exemplary basic configuration for a wireless power transmission system according to the present disclosure. This exemplary wireless power transmission system includes an oscillator 103 with an oscillation frequency f0, a power transmitting antenna 107 with a resonant frequency fT, a power receiving antenna 109 with a resonant frequency fR, and a magnetic body member 200 which is arranged between those two antennas. The resonant frequencies fT and fR are typically set to be equal to the frequency f0. However, these resonant frequencies fT, fR and f0 are not necessarily set to be equal to each other. The frequency f0 may be in the range of 50 Hz to 300 GHz. Specifically, the frequency f0 may fall within the range of 100 kHz to 10 GHz in one example and is typically set to be in the range of 500 kHz to 20 MHz. However, depending on the application, the frequency f0 may also be in the range of 10 kHz to 1 GHz, or 20 kHz to 20 MHz, 100 kHz to 205 kHz or 20 kHz to 100 kHz. In this description, the electric power to be transmitted via an oscillation magnetic field with such a frequency f0 will be sometimes referred to herein as "radio frequency power" or simply "RF power". It should be noted that at least one of the oscillation frequency f0 of the oscillator 103 and the resonant frequencies fT and fR of the power transmitting and power receiving antennas 107 and 109 could be variable.

The oscillator 103 typically receives DC power and converts the DC power into RF power with the frequency f0 (i.e., performs DC/RF conversion). As the oscillator 103, a class D, E or F amplifier that would realize a high efficiency and low distortion characteristic may be used. Or a Doherty amplifier could also be used. Optionally, a sinusoidal wave may be produced with high efficiency by arranging a low-pass filter, a band-pass filter or a band-elimination filter after a switching element that generates an output signal with a distortion component. Alternatively, the oscillator 103 may also receive AC power and convert it into RF power.

The RF power output from the oscillator 103 is supplied to the power transmitting antenna 107 which is connected to the oscillator 103. The power transmitting antenna 107 and the power receiving antenna 109 are coupled together via a resonant magnetic field that is produced by their resonators, and the power receiving antenna 109 can receive the RF power that has been transmitted by the power transmitting antenna 107. The power receiving antenna 109 is not in contact with the power transmitting antenna 107 but is located at a distance of about 10 cm to about several meters from the power transmitting antenna 107, for example.

In the wireless electric power transmission apparatus according to the present disclosure, the "antenna" is an element for transmitting electric power from one of two objects to the other, and vice versa, by using a coupling phenomenon that has been produced by the evanescent tail of the magnetic field of the resonator. According to such a wireless power transmission technique that uses the resonant magnetic coupling, power loss, which would otherwise be caused when an electromagnetic wave is transferred to a distant location, will not be caused, and therefore, the electric power can be transmitted with very high efficiency. Such a power transmission technique that uses the resonant magnetic coupling phenomenon will cause much less loss than a known wireless electric power transmission that uses the Faraday's law of electromagnetic induction.

Figure 2:
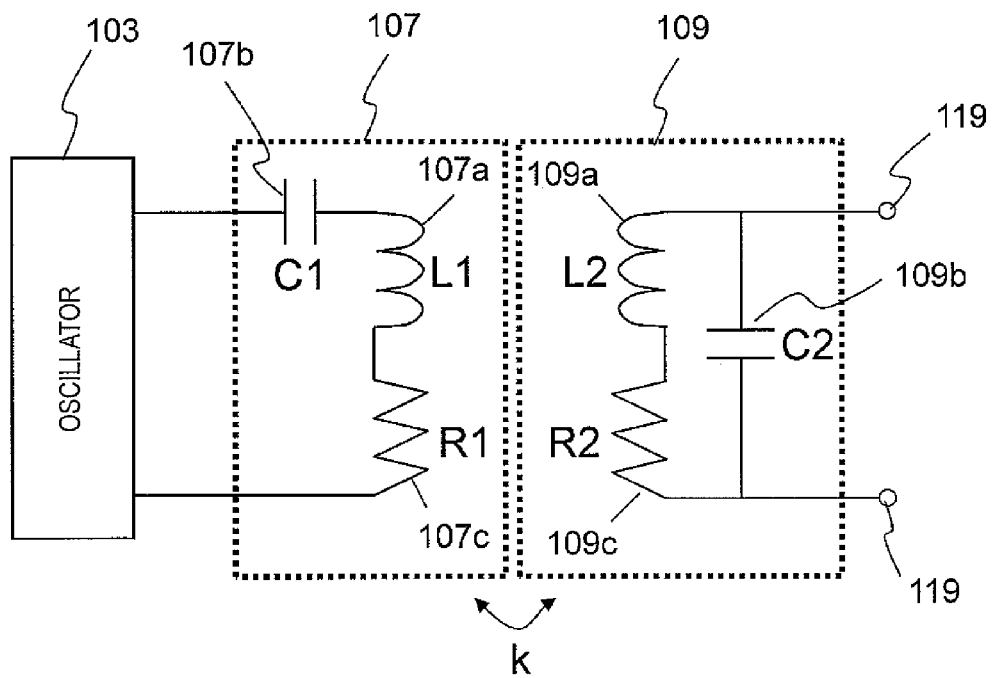
FIG. 2 illustrates an exemplary equivalent circuit for a pair of antennas for use in a wireless power transmission system according to the present disclosure.

Next, look at FIG. 2, which illustrates an exemplary equivalent circuit of the power transmitting and power receiving antennas 107 and 109. As shown in FIG. 2, the power transmitting antenna 107 according to the present disclosure is a series resonant circuit in which a first inductor 107a and a first capacitor 107b are connected together in series, while the power receiving antenna 109 is a parallel resonant circuit in which a second inductor 109a and a second capacitor 109b are connected together in parallel. The series resonant circuit of the power transmitting antenna 107 has a parasitic resistance component R1 and the parallel resonant circuit of the power receiving antenna 109 has a parasitic resistance component R2. In an alternative embodiment, the power transmitting antenna may be implemented as a parallel resonant circuit and the power receiving antenna may be implemented as a series resonant circuit.

Figure 3:
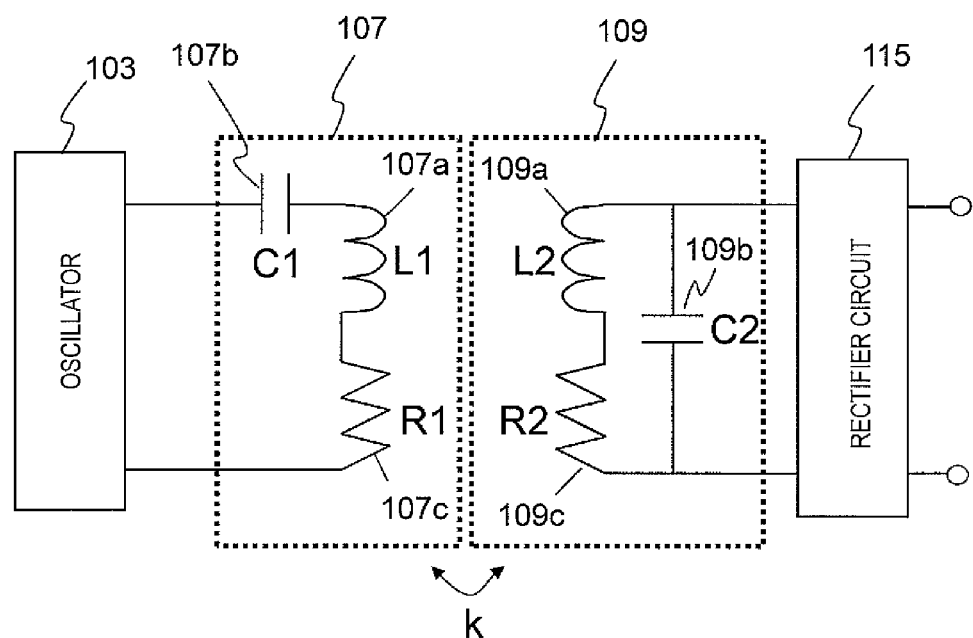
FIG. 3 illustrates an exemplary basic configuration for another wireless power transmission system (with a rectifier circuit) according to the present disclosure.

FIG. 3 illustrates another wireless power transmission system according to the present disclosure. Unlike the wireless power transmission system shown in FIG. 2, this wireless power transmission system includes a rectifier circuit (rectifier) 115 which is connected to the power receiving antenna 109. Thanks to the action of this rectifier circuit 115, the wireless power transmission system can output DC power.

In the wireless power transmission system of the present disclosure, the magnetic body member 200 is arranged between the power transmitting antenna 107 and the power receiving antenna 109 as shown in FIG. 1, thus minimizing the leaking magnetic field. The configuration and function of the magnetic body member 200 will be described later in the following description of embodiments.

In the wireless power transmission system described above, its section including the oscillator 103 and the power transmitting antenna 107 functions as a power transmitting device. Optionally, a plurality of devices, each including the power receiving antenna 109, may be allocated to a single power transmitting device. In other words, a plurality of devices, each including the power receiving antenna 109, may be sequentially arranged so as to face the power transmitting antenna 107 and electric power may be transmitted wirelessly to one of those devices after another.

(Embodiment 1)

Hereinafter, a first embodiment of a wireless power transmission system according to the present invention will be described with reference to FIGS. 4 through 7.

Figure 4:
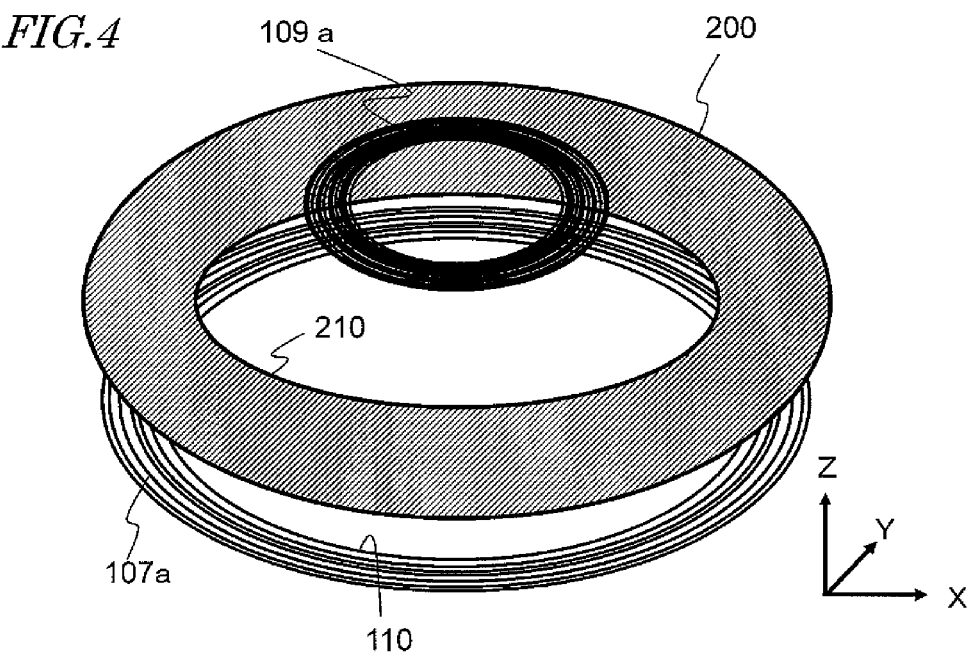
FIG. 4 is a perspective view schematically illustrating an example of a wireless power transmission system according to the present disclosure.
Figure 5:
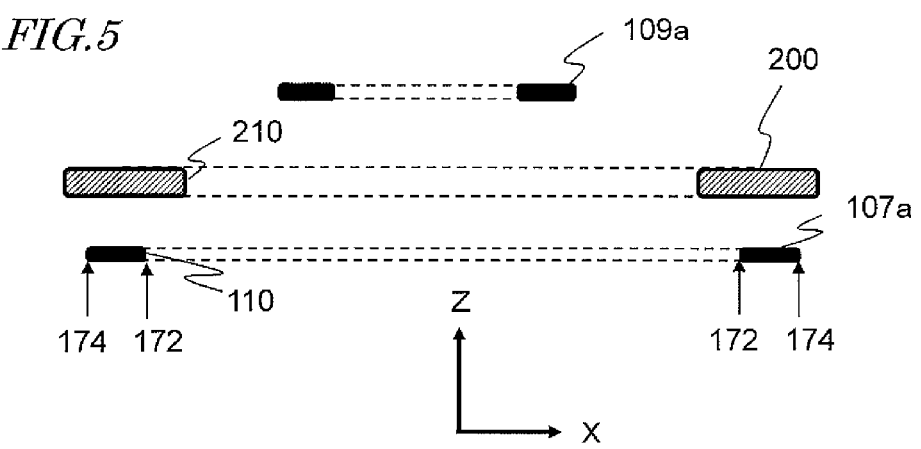
FIG. 5 is a cross-sectional view of the wireless power transmission system shown in FIG. 4.

First of all, look at FIGS. 4 and 5, which are respectively a perspective view schematically illustrating the configuration of a wireless power transmission system according to this embodiment and a cross-sectional view thereof. In FIGS. 4 and 5, of those components of the wireless power transmission system of the present disclosure described above, only the first and second inductors 107a and 109a and the magnetic body member 200 are shown for the sake of simplicity. The first and second inductors 107a and 109a are actually connected to the circuit elements shown in FIG. 2 through cables (not shown).

As shown in FIGS. 4 and 5, the first inductor 107a of this embodiment is implemented as a wiring that has been wound to have a center hole 110. On the other hand, the second inductor 109a is spaced apart from the first inductor 107a and is implemented as a wiring that has been wound to a smaller size than the hole 110 of the first inductor 107a. In this description, the first and second inductors 107a and 109a are wirings of an electrically conductive material. Some portions of the wirings may serve as leads. The portions may connect the inductors 107a and 109a to other circuits or circuit elements. The body of each of the inductors 107a and 109a is defined by an area of the wiring excluding any such lead portion and the center hole.

It should be noted that in the drawings, the respective sizes of the first and second inductors 107a and 109a and the magnetic body member 200 and their intervals are not to scale and different from the actual ones. The magnetic body member 200 may be in contact with the first inductor 107a or may be located at a distance of a few millimeters to several ten centimeters from the first inductor 107a.

In an embodiment, both of the first and second inductors 107a and 109a may be arranged so as to extend on two different planes and face each other in parallel. The profile of the inductors 107a and 109a that function as respective antennas does not have to be a circular one but may also be an elliptical, polygonal or any other arbitrary shape. In the example illustrated in FIGS. 4 and 5, both of the inductors 107a and 109a have axisymmetric shapes. However, one or both of the inductors 107a and 109a may also have a shape with a low degree of symmetry (such as an elliptical shape, a rectangular shape or a band shape). In one embodiment, the size of the first inductor 107a may be set to be greater when measured in a first direction than when measured perpendicularly to the first direction.

In this embodiment, the first and second inductors 107a and 109a have a spiral structure, of which the numbers of turns are N1 and N2, respectively, where N1>1 and N2>1. However, the first and second inductors 107a and 109a may also have a loop structure with a number of turns of one. These inductors 107a and 109a do not have to be made of a single-layer conductor pattern but may also be a series connection of multiple conductor patterns that have been stacked one upon the other.

The first and second inductors 107a and 109a are suitably made of copper, silver or any other conductor with good electrical conductivity. As RF current with RF power flows mostly around the surface of a conductor, the surface of the conductor may be covered with a material with high electrical conductivity to increase the power generation efficiency. If the inductors 107a and 109a are designed so as to have a cavity in the middle of its cross section, their weight can be reduced. Furthermore, if the inductors 107a and 109a are formed by adopting a parallel wiring structure with Litz wires, for example, then the conductor loss per unit length can be reduced and the Q factors of the series resonant circuit and the parallel resonant circuit can be increased. As a result, electric power can be transmitted with even higher efficiency.

As described above, electric power is transmitted from the first inductor 107a to the second inductor 109a, or vice versa, via resonant magnetic coupling. In an embodiment of the present invention, the second inductor 109a may be built in an electric vehicle and the first inductor 107a may be embedded in a road. In that case, as the electric vehicle can move, the position of the second inductor 109a with respect to the first inductor 107a may also change.

The second inductor 109a built in an electric vehicle may have a size that is small enough to be fitted in a rectangular area with a size of 20 to 30 cm one side. In that case, the hole 110 of the first inductor 107a may have a width (which is a size as measured perpendicularly to the electric vehicle's traveling direction) of 30 to 300 cm. When used for charging the car running, the first inductor 107a may have a structure that is stretched in the vehicle's running direction. When such a structure is adopted, the respective sizes of the first and second inductors 107a and 109a as measured in the vehicle's running direction can be called the "lengths" of the inductors, while their sizes as measured perpendicularly to the vehicle's running direction can be called the "widths" of the inductors. The width of the first inductor 107a may be set to fall within the range of 30 to 300 cm and that of the second inductor 109a may be set to fall within the range of 20 to 30 cm. In one embodiment, (width of first inductor 107a, width of second inductor 109a) may be set to be (40-400 cm, 30-40 cm), and may also be set to be (50-500 cm, 40-50 cm) and (75-500 cm, 50-75 cm).

To reduce the leaking magnetic field while electric power is being transmitted, this wireless power transmission system includes the magnetic body member 200 which is arranged on one side of the first inductor 107a so as to face the second inductor 109a. The magnetic body member 200 of this embodiment has a doughnut shape with a center hole 210 and may be made of a magnetic material such as ferrite. As long as it exhibits a ferromagnetic property, it does not matter whether this magnetic material is a soft magnetic material or a hard magnetic material. In the example illustrated in FIG. 4, the magnetic body member 200 covers the first inductor 107a entirely.

The magnetic body member 200 covers the first inductor 107a at least partially, thereby avoiding an excessive increase in magnetic flux density in the space over the first inductor.

According to the known power transmission technique by electromagnetic induction, the respective sizes and shapes of the power transmitting and power receiving inductors are set to be substantially equal to each other, and therefore, there is no room for any human being to enter the upper surface of the first inductor 107a. On the other hand, according to the resonant magnetic coupling method, even if the power transmitting and power receiving antennas have different sizes or shapes, energy can be transferred efficiently between the power transmitting and power receiving antennas as long as their resonant frequencies are substantially the same. As a result, if the first inductor 107a has a larger size than the second inductor 109a, energy can be transferred without matching their positions. However, particularly around the coil of the first inductor 107a, the magnetic flux could have too high a density locally until a safety guideline value is exceeded. That is why if a human being enters the vicinity of the coil of the first inductor 107a, there is a risk that he or she would be exposed to a high density magnetic field. According to the configuration of this embodiment of the present invention, such a problem peculiar to the power transmission technique by resonant magnetic coupling can be overcome by adjusting the magnetic field distribution around the first inductor 107a by interposing such a magnetic body member. The thickness of the magnetic body member 200 is typically set to be within the range of 0.1 to 500 mm and suitably set to fall within the range of 1 to 100 mm.

Figure 6A:
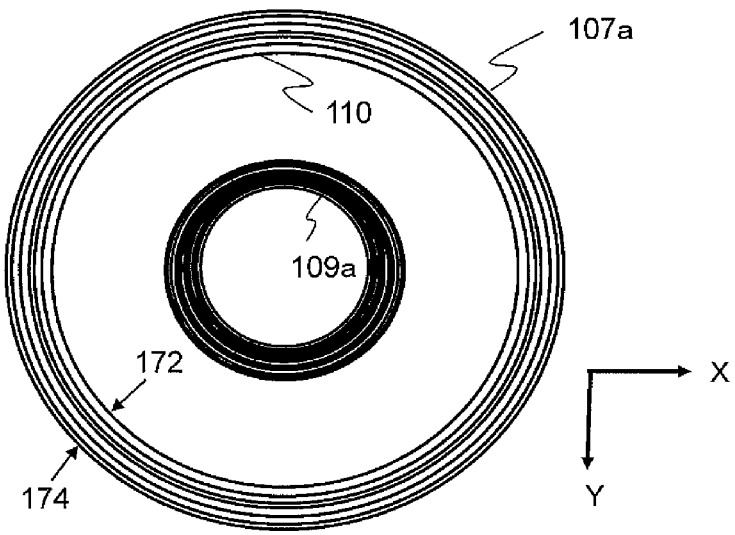
FIG. 6A illustrates an exemplary arrangement in which no magnetic body member 200 is interposed between first and second inductors 107a and 109a (which represents a comparative example) as viewed from under its reverse side.

FIG. 6A illustrates an exemplary arrangement in which no magnetic body member 200 is interposed between the first and second inductors 107a and 109a (which represents a comparative example) as viewed from under its reverse side (i.e., from the negative side of the Z-axis). As can be seen from FIG. 6A, when projected vertically onto a YX plane, the second inductor 109a is totally inside of the hole 110 of the first inductor 107a. The second inductor 109a is much smaller than the hole 110 of the first inductor 107a. That is why even if the position of the second inductor 109a with respect to the first inductor 107a has changed, the vertical projection of the second inductor 109a onto the YX plane could still be inside of the vertical projection of the hole 110 of the first inductor 107a onto the same YX plane.

Figure 6B:
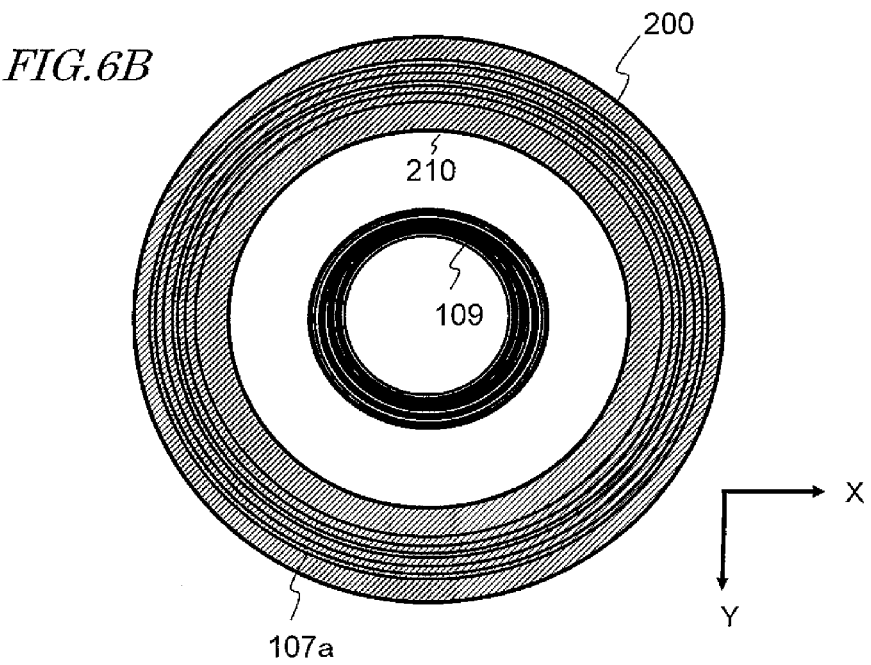
FIG. 6B illustrates an exemplary arrangement in which a magnetic body member 200 is interposed between the first and second inductors 107a and 109a as viewed from under its reverse side.

FIG. 6B illustrates an exemplary arrangement in which a magnetic body member 200 is interposed between the first and second inductors 107a and 109a as viewed from under its reverse side (i.e., from the negative side of the Z-axis). As can be seen from FIG. 6B, when projected vertically onto a YX plane, the first inductor 107a is totally inside of the magnetic body member 200. In other words, a part of the first inductor 107a that is covered with the magnetic body member reaches the outer edge 174 of the first inductor 107a from its inner edge 172.

Figure 7:
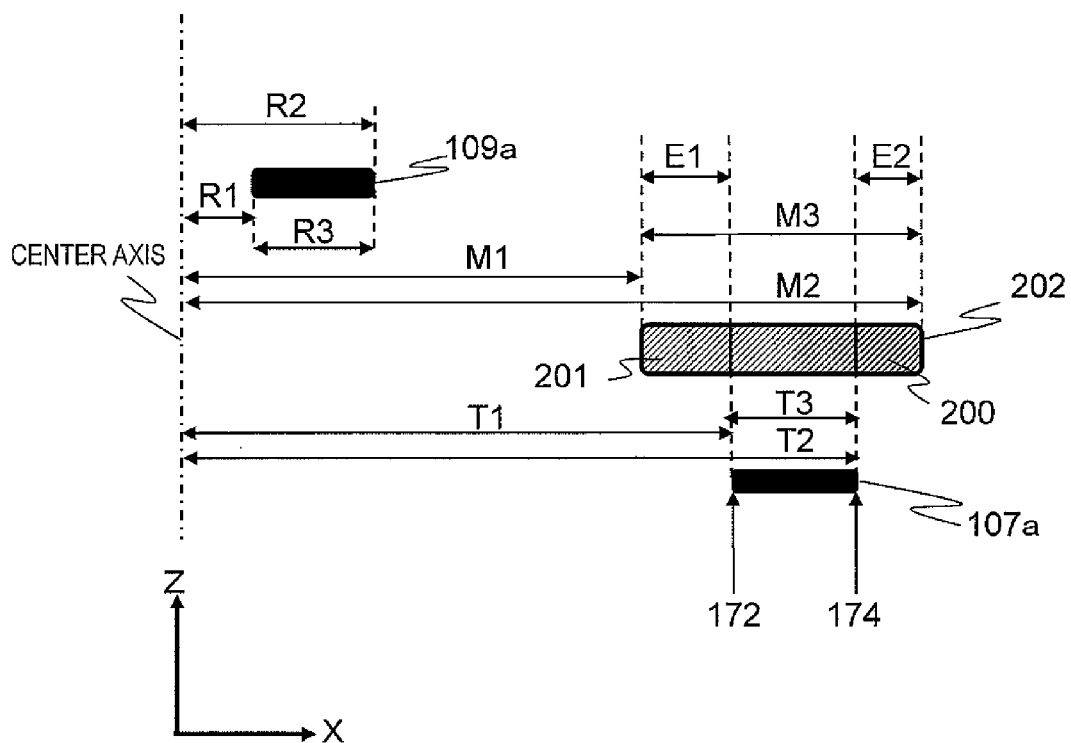
FIG. 7 is an enlarged cross-sectional view of the right half of the system shown in FIG. 5 and shows the respective sizes of the first and second inductors 107a and 109a and the magnetic body member 200 and their distances from the center axis.

Next, look at FIG. 7, which is an enlarged cross-sectional view of the right half of the system shown in FIG. 5 and which shows the respective sizes of the first and second inductors 107a and 109a and the magnetic body member 200 and their distances from the center axis. The following Table 1 summarizes what the respective reference signs shown in FIG. 7 mean:

TABLE 1

| | |
|---|---|
| T1 | Distance from center axis to inner edge 172 of first inductor 107a |
| T2 | Distance from center axis to outer edge 174 of first inductor 107a |
| T3 | Width of first inductor 107a |
| R1 | Distance from center axis to inner edge of second inductor 109a |
| R2 | Distance from center axis to outer edge of second inductor 109a |
| R3 | Width of second inductor 109a |
| M1 | Distance from center axis to inner edge of magnetic body member 200 |
| M2 | Distance from center axis to outer edge of magnetic body member 200 |
| M3 | Width of magnetic body member 200 |
| E1 | Width of inner extended portion 201 of magnetic body member 200 |
| E2 | Width of outer extended portion 202 of magnetic body member 200 |

In this Table 1, the inner extended portion 201 of the magnetic body member 200 is portion of the magnetic body member 200 that extends from the inner edge 172 of the first inductor 107a toward the center of the hole 110 when viewed in the Z-axis direction. On the other hand, the outer extended portion 202 of the magnetic body member 200 is portion of the magnetic body member 200 that extends outward from the outer edge 174 of the first inductor 107a when viewed in the Z-axis direction.

In this embodiment, $R2<T1$, $M1 \le T1$ ($0 \le E1$) and $T2 \le M2$ ($0 \le E2$) are satisfied. $R2 \le M1$ is not necessarily satisfied but is satisfied in on embodiment.

Based on the principle described above, according to this embodiment, the distance between the power transmitting and power receiving antennas 107 and 109 can be set to be within the range of a few millimeters to several meters and electric power can be transmitted with high efficiency even if there is the air or any other dielectric body between them. Since the magnetic body member 200 has a hole, the electric power transmission efficiency is not adversely affected by the magnetic body member 200.

The dimensions of the respective parts shown in FIG. 7 apply to not just when the antennas have axisymmetric shapes as shown in FIG. 5. For example, even if the first inductor 107a has a structure that is stretched in a first direction, a cross section that intersects with the first direction at right angles may be defined and the sizes of the respective parts in that cross section may also be defined as shown in FIG. 7.

In a cross section of the first and second inductors 107a and 109a as viewed in one direction, the sizes R2 and T1 shown in FIG. 7 may satisfy $10\% \le R2/T1 < 100\%$. In one embodiment, $10\% \le R2/T1 < 50\%$ may be satisfied.

To reduce multiple reflection of the RF power between the circuit blocks and to improve the overall power generation efficiency, when the output terminal of the power receiving antenna 109 is connected to a load, the output impedance Zoc of the RF power of the oscillator 103 may be matched to the input impedance Zic of the power transmitting antenna 107. Likewise, when the oscillator 103 is connected to the power transmitting antenna 107, the output impedance Zout of the power receiving antenna may be matched to the resistance value R of the connected load. In this description, if two impedances are "equal to each other", then the impedances may naturally be exactly equal to each other but could also be just roughly equal to each other. Specifically, if the difference between the greater and smaller impedances is within 25% of the greater one, then those two impedances will also be regarded herein as being "equal to each other".

Another magnetic body other than the magnetic body member 200 may be arranged around the first and/or second inductor(s) 107a, 109a. As the first and second capacitors 107b and 109b, any type of capacitors, which may have a chip shape, a lead shape or any other appropriate shape, may be used. Optionally, the capacitance produced between two levels of wires that interpose the air between them could also function as the first and second capacitors 107b and 109b. If the first and second capacitors 107b and 109b are implemented as MIM capacitors, a low-loss capacitor circuit can be formed by known semiconductor device processing or multilevel circuit board process.

In order to increase the long-term reliability, those parts that form the power transmitting and power receiving antennas 107 and 109 (such as their inductors and capacitors) may be housed in a protective housing. Alternatively, those parts may also have their exterior molded with resin. In that case, a resin in which a magnetic body is dispersed may also function as a molding member. Also, the protective housing may also be subjected to waterproof treatment.

To minimize the transmission loss, the power transmitting and power receiving antennas 107 and 109 are arranged as close to each other as possible.

EXAMPLE 1

As to a specific example 1 having numerical parameters shown in the following Table 2, the distribution of the magnetic field strengths in the space was obtained by analyzing the electromagnetic field. A structure defined by those numerical parameters is as shown in FIG. 7. Meanwhile, as a comparative example 1, a system having the same configuration as that specific example 1, except that the magnetic body member was removed, was made and the distribution of leaking magnetic field strengths was obtained by simulations.

TABLE 2

| | |
|---|---|
| T1 | 64 cm |
| T2 | 75 cm |
| T3 | 11 cm |
| R1 | 18.5 cm |
| R2 | 25 cm |
| R3 | 6.5 cm |
| M1 | 55 cm |
| M2 | 90 cm |
| M3 | 35 cm |
| E1 | 9 cm |
| E2 | 15 cm |

The positions of the respective bottoms of the first and second inductors 107a and 109a and the magnetic body member 200 in the Z-axis direction (i.e., their Z coordinates) were 0 cm, 25 cm, and 2 cm, respectively. Also, the gap between the first inductor 107a and the magnetic body member 200 was 1.5 cm. The magnetic body was supposed to be ferrite and its permeability and conductivity were set to be 1000 and 0.01 S/m, respectively.

When an RE power of 1.5 kW was transmitted (at a frequency of 120 kHz), the leaking magnetic field strength as measured 25 cm over the first inductor 107a (and at a point defined by a radius of 70 cm from the center axis of the first inductor) was 50.9 A/m in the comparative example 1. In a specific example 1, on the other hand, the leaking magnetic field strength as measured 25 cm over the first inductor 107a was 27.1 A/m. As can be seen, although there was a risk of exposure to a magnetic field with an excessively high density in the comparative example 1, the effect of reducing the magnetic field strength by 47% (i.e., a magnetic field suppression ratio of 1.9) could be achieved in the specific example.

Meanwhile, Comparative Example 2, in which M1 and M3 were set to be 50 cm and 14 cm, respectively, unlike Example 1, was also analyzed. That is to say, in Comparative Example 2, the magnetic body member 200 was provided as a ring over a region that was inside of the inner edge 172 of the first inductor 107a and did not overlap with the coil portion of the first inductor 107a. In Comparative Example 2, the leaking magnetic field strength as measured 25 cm over the first inductor 107a increased by 12% compared to Comparative Example 1.

Furthermore, Comparative Example 3, in which M1=T2=75 cm and M3=14 cm were satisfied unlike Example 1, was also analyzed. That is to say, in Comparative Example 3, the magnetic body member 200 was provided as a ring over a region that was outside of the outer edge 174 of the first inductor 107a and did not overlap with the coil portion of the first inductor 107a. In Comparative Example 2, the leaking magnetic field strength as measured 25 cm over the first inductor 107a increased 6% compared to Comparative Example 1.

EXAMPLE 2

Figure 8A:
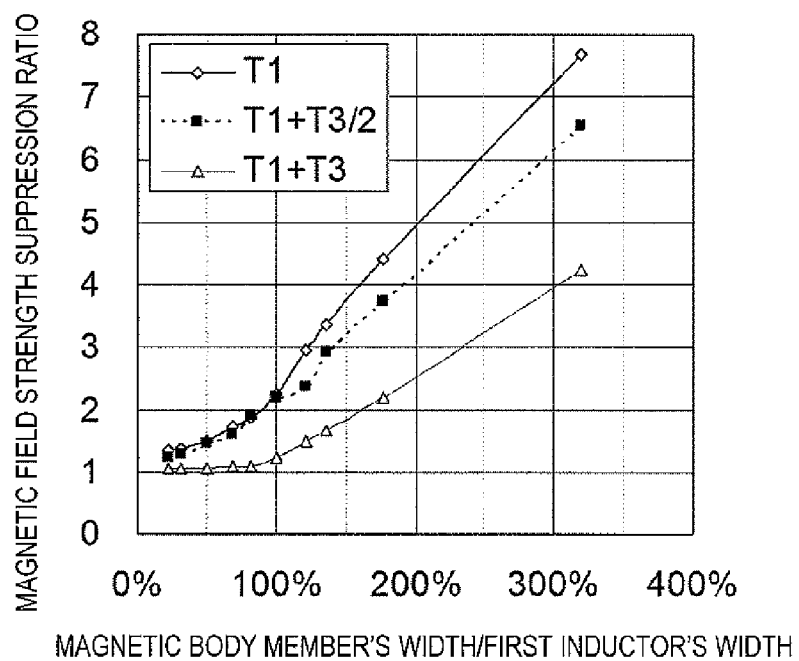
FIG. 8A is a graph showing how the leaking magnetic field strength changes with the width E1 of the inner extended portion of the magnetic body member 200 in Example 2 (when Z=5 cm).

FIG. 8A is a graph showing how the leaking magnetic field strength changes with the width M3 of the outer extended portion 202 of the magnetic body member 200 in Example 1 described above. In FIG. 8A, the ordinate represents the magnetic field suppression ratio with respect to a value before the magnetic body was introduced, while the abscissa represents how much the coil portion of the coil on the transmitting end was covered with the magnetic body introduced (i.e., the ratio of M3 to T3). The characteristics shown in FIG. 8A were obtained at a position where Z=5 cm. In this case, the respective widths of the inner and outer extended portions 201 and 202 were set to be equal to each other (i.e., E1=E2 was supposed to be satisfied). It should be noted that the parameter values other than M3 are equal to those of Example 1. These three curves show the characteristics that were obtained at respective distances X of T1, T1+T3/2, and T1+T3 from the center axis. As can be seen from FIG. 8A, even when X=T1+T3 was satisfied in the space over the outer edge of the coil and even if M3/T3<1 was satisfied, the magnetic field strength could always be reduced to a certain degree by introducing the magnetic body. The present inventors also discovered that if the condition M3/T3≥1 was satisfied, the larger M3, the higher the improvement ratio. Furthermore, if X=T1 was satisfied and if X=T1+T3/2 was satisfied, the suppression ratio was always higher than when the condition described above X=T1+T3 was satisfied. That is to say, the effect of reducing the leaking magnetic field strength according to the present invention could be achieved more significantly in the space over the inner edge portion of the coil of the first inductor rather than in the space over the outer edge portion of its coil.

Figure 8B:
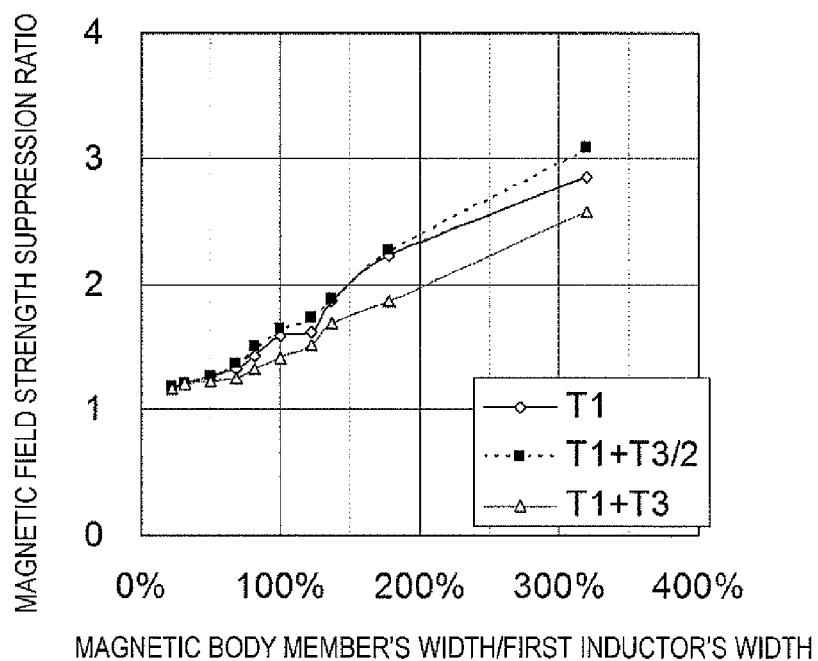
FIG. 8B is a graph showing how the leaking magnetic field strength changes with the width E1 of the inner extended portion of the magnetic body member 200 in another specific example (when Z=12 cm).
Figure 8C:
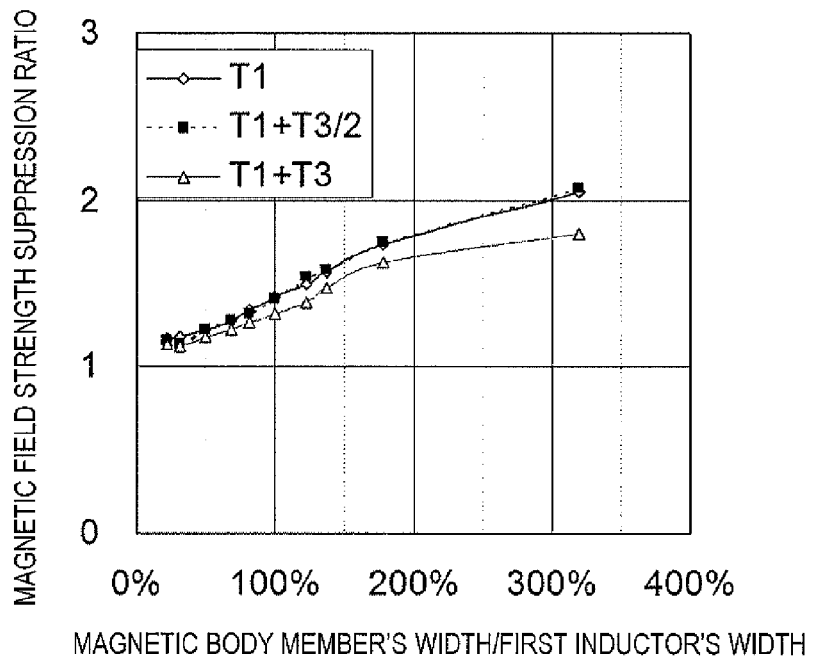
FIG. 8C is a graph showing how the leaking magnetic field strength changes with the width E1 of the inner extended portion of the magnetic body member 200 in another specific example (when Z=20 cm).
Figure 8D:
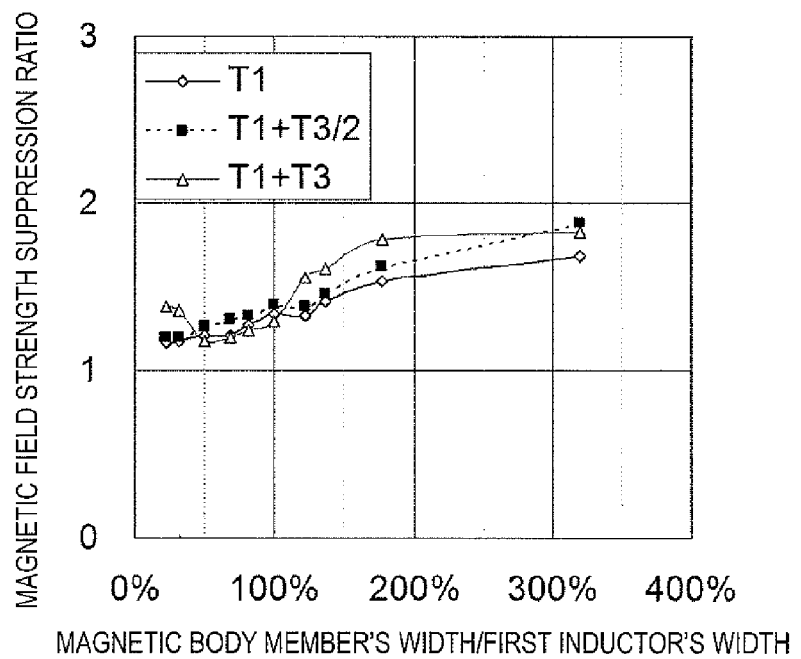
FIG. 8D is a graph showing how the leaking magnetic field strength changes with the width E1 of the inner extended portion of the magnetic body member 200 in another specific example (when Z=27 cm).

On the other hand, FIGS. 8B, BC and 8D show the effect of this specific example when Z=12, 20 and 27 cm, respectively. Compared to FIG. 8A showing the effect that was achieved right over the coil portion of the first inductor, the value of the magnetic field suppression ratio did decrease but the leaking magnetic field strength never increased even when the magnetic body of the present invention was introduced.

(Embodiment 2)

Figure 9:
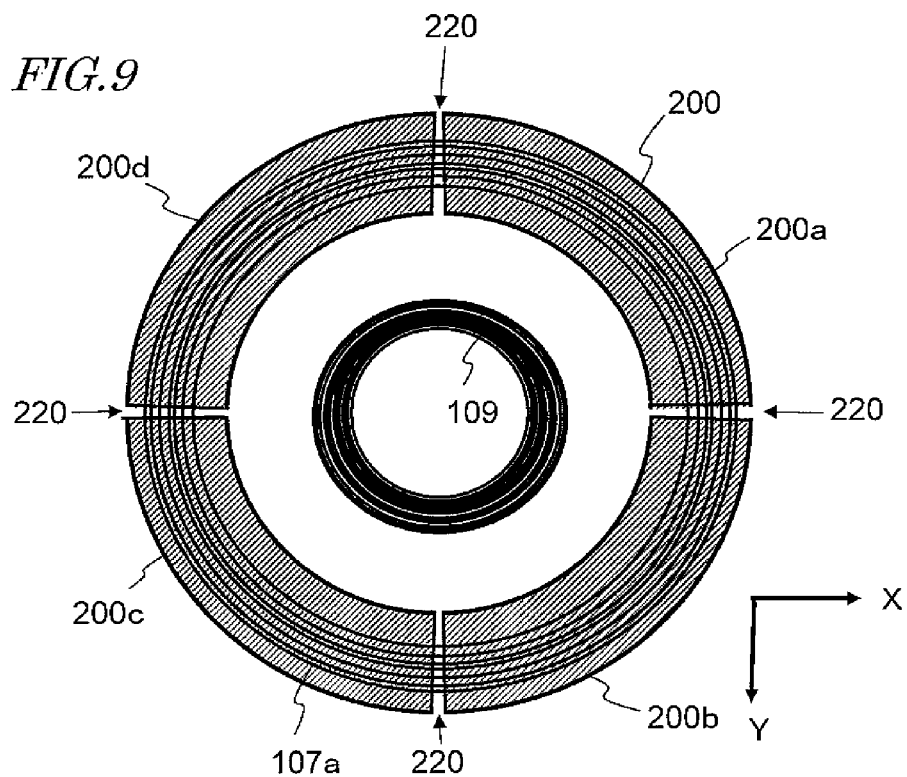
FIG. 9 illustrates an example in which the magnetic body member 200 is divided into four parts.

Hereinafter, a second embodiment of a wireless power transmission system according to the present invention will be described with reference to FIG. 9.

The only difference between this embodiment and the embodiment described above lies in the configuration of the magnetic body member 200. Thus, the description of this embodiment will be focused on the magnetic body member 200 and the other members will not be described all over again to avoid redundancies.

The magnetic body member 200 of this embodiment is divided into a plurality of parts 200a, 200b, 200c and 200d, between which there may be gaps 220. If those gaps 220 are left, the magnetic body member 200 does not cover the first inductor 107a entirely. That is to say, portions of the first inductor 107a are not covered with the magnetic body member 200. That is why the magnetic field could leak through those gaps 220 in such a situation. However, if the width of the gaps 220 is set to be much smaller than (e.g., a half or less of) the thickness of the magnetic body member 200, their influence is negligible. Each of those parts 200a, 200b, 200c and 200d covers the first inductor 107a from its inner edge 172 through its outer edge 174. More specifically, each of those parts 200a, 200b, 200c and 200d includes a first portion 201 that extends from the inner edge 172 of the first inductor 107a toward the center of the hole 110 and a second portion 202 that extends outward from the outer edge 174 of the first inductor 107a.

As can be seen, according to this embodiment, a portion of the first inductor 107a that is covered with the magnetic body member 200 reaches its outer edge 174 from its inner edge 172 as shown in FIG. 5.

(Embodiment 3)

Hereinafter, a third embodiment of a wireless power transmission system according to the present invention will be described with reference to FIG. 10.

Figure 10:
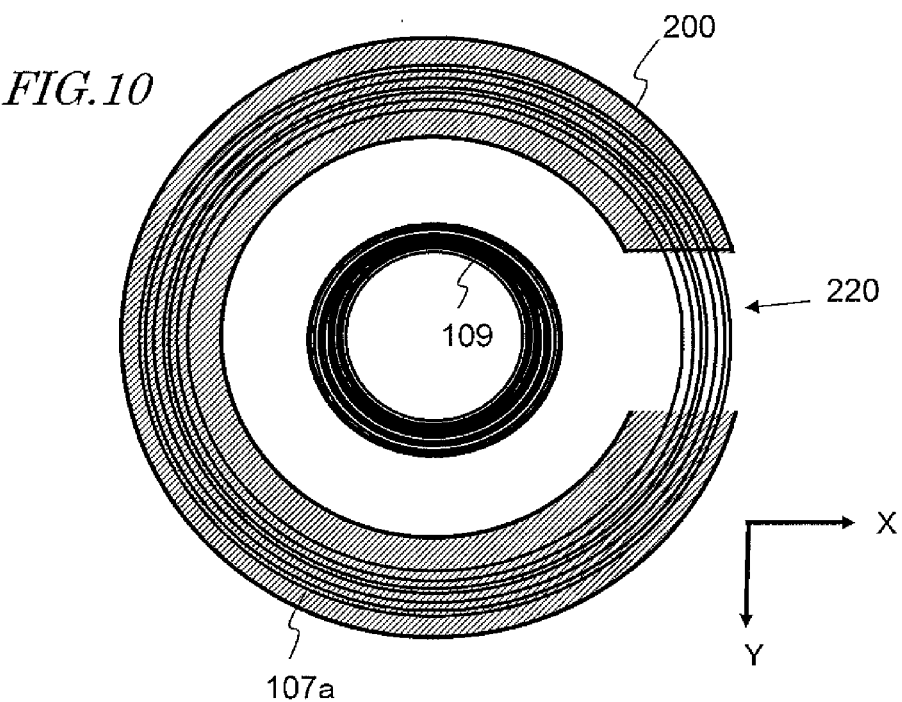
FIG. 10 illustrates an example in which a portion of the first inductor 107a is not covered with the magnetic body member 200.

In FIG. 10, the magnetic body member 200 has a partially notched shape (i.e., has a gap 220) and the first inductor 107a is not covered with the magnetic body member 200 in that notched portion. However, the other portion of the first inductor 107a that is covered with the magnetic body member 200 reaches its outer edge 174 from its inner edge 172 as shown in FIG. 5.

Although the magnetic field could leak from that portion that is not covered with the magnetic body member 200, there would be no problem if everybody is prohibited from accessing that portion and surrounding areas.

The wireless power transmission system of any of the embodiments described above includes an overall flat magnetic body member 200. However, the magnetic body member 200 may also have unevenness or level differences on its surface or may be curved either entirely or only partially.

Optionally, the surface of the magnetic body member 200 may be coated with a protective film of a non-magnetic material. Also, a metal layer or a dielectric layer may be arranged on the upper or lower surface of the magnetic body member 200.

(Embodiment 4)

Figure 11:
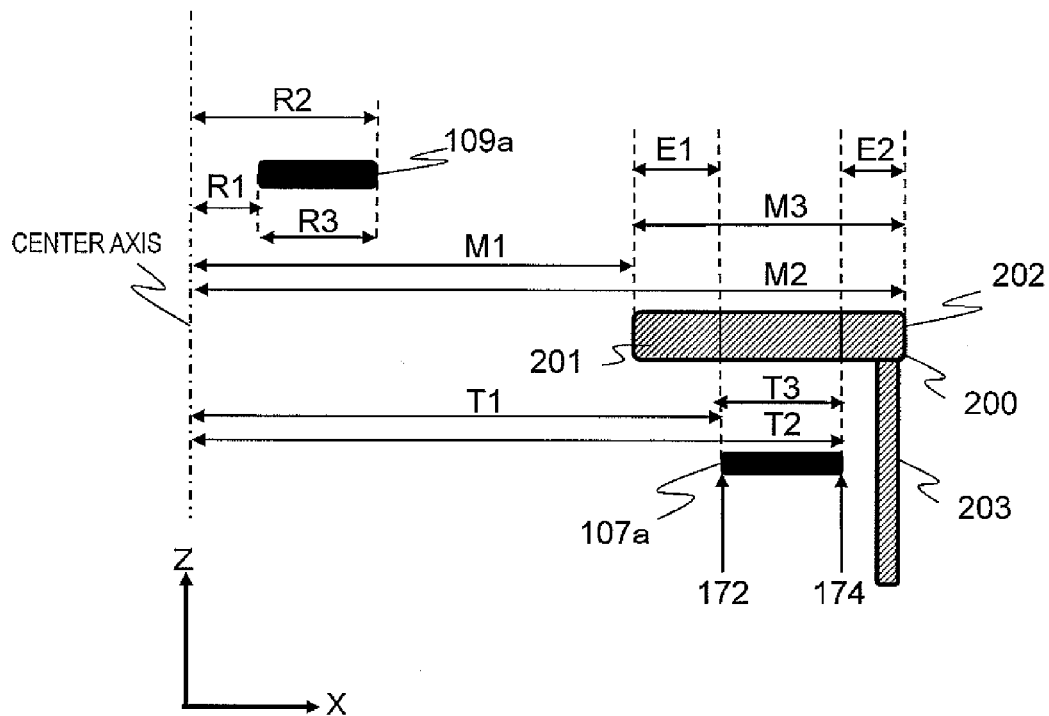
FIG. 11 illustrates another configuration for the magnetic body member 200.

Hereinafter, a fourth embodiment of a wireless power transmission system according to the present invention will be described with reference to FIG. 11.

In the arrangement shown in FIG. 7, the magnetic body member 200 faces only the upper surface of the coil portion of the first inductor 107a. In this embodiment, however, the magnetic body member 200 further includes an additional magnetic body member 203 which faces the side surface of the outer edge 174 of the first inductor 107a. That additional portion 203 of the magnetic body member 200 does not have to face the entire side surface of the outer edge 174 of the first inductor 107a. However, the larger the percentage of the side surface facing the additional portion, the more significantly the expected effect can be achieved. Alternatively, the additional magnetic body member 203 may also be arranged so as to face the side surface of the inner edge 172 of the first inductor 107a.

EXAMPLE 3

Example 3, which is a variation of Example 1 that was modified in the following respects, was evaluated. Specifically, a ringlike additional magnetic body member with a height of 5 cm was arranged under the magnetic body member 200 so as to be further spaced apart from the outer edge 174 by 5 cm. When compared under the condition that an RF power of 1.5 kW was transmitted at a frequency of 120 kHz as in Example 1 described above, the leaking magnetic field suppression ratio as measured 25 cm over the first inductor 107a was 1.9 in Example 1 but was 2.1 in Example 3.

(Embodiment 5)

Figure 12:
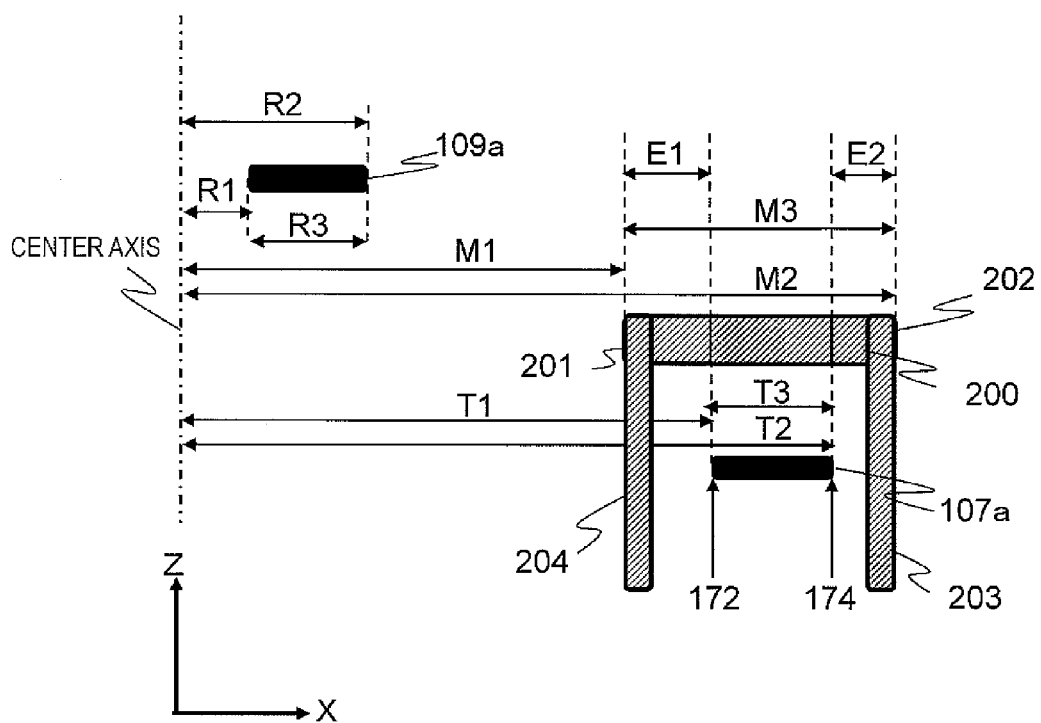
FIG. 12 illustrates still another configuration for the magnetic body member 200.

Hereinafter, a fifth embodiment of a wireless power transmission system according to the present invention will be described with reference to FIG. 12.

In the arrangement shown in FIG. 7, the magnetic body member 200 faces only the upper surface of the coil portion of the first inductor 107a. In this embodiment, however, the magnetic body member 200 further includes two additional magnetic body members 204 and 203 which face the respective side surfaces of the inner and outer edges 172 and 174 of the first inductor 107a. The major difference from the fourth embodiment is that the magnetic body member is provided so as to face not only the side surface of the outer edge 174 of the first inductor 107*a* but also the side surface of its inner edge 172 as well. By adopting such an arrangement, the effect of reducing the leaking magnetic field strength on the upper surface of the coil portion of the first inductor 107*a* can be enhanced.

EXAMPLE 4

Two ringlike additional magnetic body members 203 and 204 with a height of 5 cm were arranged under the magnetic body member 200 of Example 1 so as to be further spaced apart from the outer and inner edges 174 and 172 by 5 cm. When compared under the condition that an RF power of 1.5 kW was transmitted at a frequency of 120 kHz as in Example 1 described above, the leaking magnetic field suppression ratio as measured 25 cm over the first inductor 107*a* was 1.9 in Example 1 but was 2.4 in Example 4.

(Embodiment 6)

Figure 13:
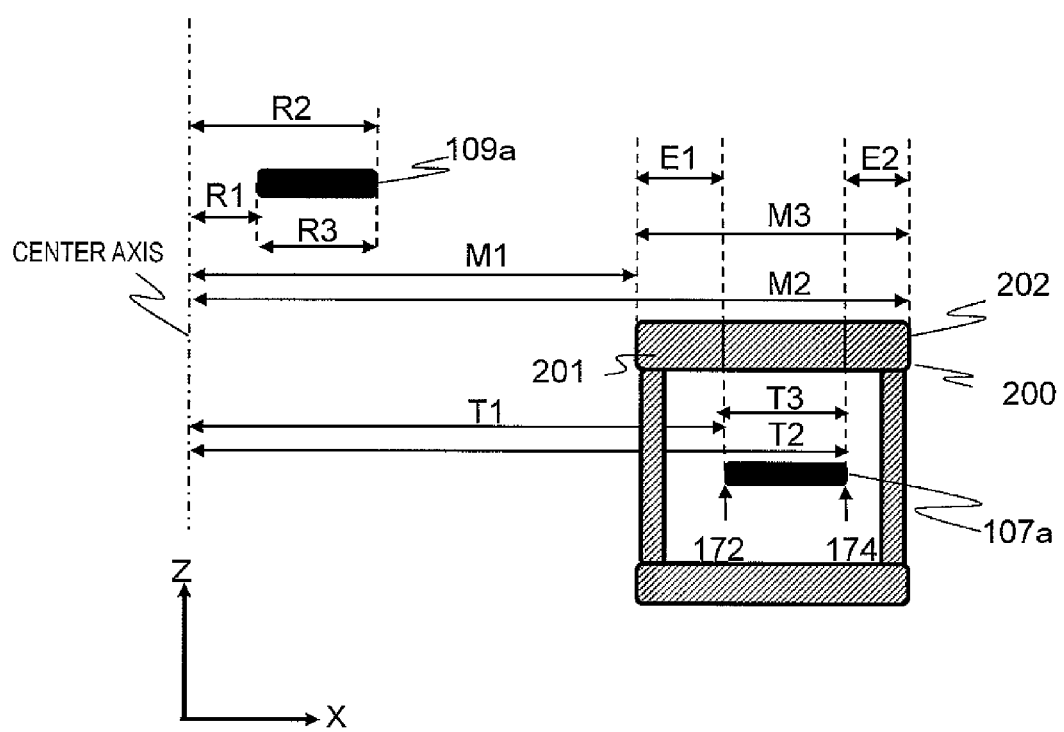
FIG. 13 illustrates yet another configuration for the magnetic body member 200.

Hereinafter, a sixth embodiment of a wireless power transmission system according to the present invention will be described with reference to FIG. 13.

In the arrangement shown in FIG. 7, the magnetic body member 200 faces only the upper surface of the coil portion of the first inductor 107*a*. In this embodiment, however, the magnetic body member 200 encloses the first inductor 107*a* entirely. By adopting such an arrangement, the effect of reducing the leaking magnetic field strength on the upper surface of the coil portion of the first inductor 107*a* can be further enhanced.

EXAMPLE 5

Two ringlike additional magnetic body members with a height of 5 cm were arranged under the magnetic body member 200 of Example 1 so as to be located at a thickness of 5 cm from the outer and inner edges. The additional magnetic body members were provided not only over the upper surface of the first inductor 107*a* but also under its lower surface as well. Their thicknesses, widths and distances from the first inductor 107*a* are the same as the condition on the magnetic body member 200 of Example 1. When compared under the condition that an RF power of 1.5 kW was transmitted at a frequency of 120 kHz as in Example 1 described above, the leaking magnetic field suppression ratio as measured 25 cm over the first inductor 107*a* was 1.9 in Example 1 but was 2.9 in Example 5.

A power receiving device according to the present disclosure is for use in a wireless power transmission system of the present disclosure. The power receiving device includes whichever one of the first and second inductors that receives power. In one embodiment, the power receiving device according to the present disclosure may be incorporated in an electronic product such as an electric vehicle or a mobile device.

A wireless power transmission system and power transmitting device according to the present disclosure can transmit electric power to a relatively big device safely, and therefore, can be used effectively to supply electric power to a big moving machine such as an electric vehicle. In addition, since the system and device of the present disclosure can ensure the safety of a human user even when he or she may come rather close to it, the system and device of the present disclosure can also be used effectively as a cradle for supplying power to an audiovisual appliance.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A wireless power transmission system configured to transmit electric power by a non-contact method from a first inductor to a second inductor, or vice versa, via resonant magnetic coupling, the system comprising:
the first inductor that has a center hole;
the second inductor that is spaced apart from the first inductor and that is smaller in size than the hole of the first inductor; and
a magnetic body that is interposed between the first inductor and the second inductor, that covers from an inner edge of the first inductor to an outer edge thereof, and that has a center hole being larger in size than the second inductor, so as to reduce a leaking magnetic field over the first inductor while transmitting electric power between the first inductor and the second inductor,
wherein the magnetic body includes a portion that extends from the inner edge of the first inductor toward the center of the hole and a portion that extends outside of the first inductor from the outer edge of the first inductor.

2. The wireless power transmission system of claim 1, wherein the magnetic body covers the first inductor entirely.

3. The wireless power transmission system of claim 1, wherein the magnetic body covers the first inductor only partially.

4. The wireless power transmission system of claim 2, wherein the magnetic body includes a plurality of parts, each of which covers the first inductor from its inner edge through its outer edge.

5. The wireless power transmission system of claim 1, wherein the magnetic body has a portion that faces at least one of the inner and outer edge side surfaces of the first inductor.

6. The wireless power transmission system of claim 5, wherein the magnetic body encloses the first inductor.

7. The wireless power transmission system of claim 1, wherein the second inductor is built in an electric vehicle.

8. The wireless power transmission system of claim 1, wherein the first inductor is embedded in a road.

9. The wireless power transmission system of claim 1, wherein the size of the first inductor is larger when measured in a first direction than when measured perpendicularly to the first direction.

* * * * *